(12) United States Patent
Baer et al.

(10) Patent No.: US 7,757,380 B2
(45) Date of Patent: Jul. 20, 2010

(54) METHODS FOR THE MANUFACTURE OF NOTCHED TRAILING SHIELDS

(75) Inventors: Amanda Baer, Campbell, CA (US); Hung-chin Guthrie, Saratoga, CA (US); Yimin Hsu, Sunnyvale, CA (US); Ming Jiang, San Jose, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 578 days.

(21) Appl. No.: 11/595,654

(22) Filed: Nov. 10, 2006

(65) Prior Publication Data
US 2008/0113514 A1 May 15, 2008

(51) Int. Cl.
G11B 5/127 (2006.01)
H04R 31/00 (2006.01)

(52) U.S. Cl. ............. 29/603.16; 29/603.07; 29/603.13; 29/603.15; 29/603.18; 205/199; 205/122; 216/62; 216/65; 216/66; 360/121; 360/122; 360/317; 451/5; 451/41

(58) Field of Classification Search ............. 29/603.07, 29/603.13–603.16, 603.18; 205/119, 122; 216/62, 65, 66; 360/121, 122, 126, 317; 451/5, 41
See application file for complete search history.

(56) References Cited

U.S. PATENT DOCUMENTS

| | | | |
|---|---|---|---|
| 6,757,141 B2 | 6/2004 | Santini et al. | |
| 7,029,376 B1 * | 4/2006 | Guthrie et al. | 451/41 |
| 7,120,988 B2 * | 10/2006 | Le et al. | 29/603.07 |
| 2004/0012894 A1 | 1/2004 | Pust et al. | |
| 2005/0068665 A1 | 3/2005 | Le et al. | |
| 2005/0068671 A1 | 3/2005 | Hsu et al. | |
| 2005/0102820 A1 | 5/2005 | Chang et al. | |
| 2005/0190491 A1 | 9/2005 | Le et al. | |
| 2005/0259355 A1 | 11/2005 | Gao et al. | |
| 2005/0264931 A1 | 12/2005 | McFadyen | |
| 2006/0023352 A1 | 2/2006 | Le et al. | |

* cited by examiner

*Primary Examiner*—Paul D Kim
(74) *Attorney, Agent, or Firm*—D'Arcy H. Lorimer; Lorimer Labs

(57) ABSTRACT

Methods for improving within wafer and wafer to wafer yields during fabrication of notched trailing shield structures are disclosed. Ta/Rh CMP stop layers are deposited prior to planarization and notch formation to ensure a planar surface for trailing shield structures. These stop layers may be blanket deposited or patterned prior to CMP. Patterned stop layers produce the highest yields.

8 Claims, 13 Drawing Sheets

METHODS FOR THE MANUFACTURE OF NOTCHED TRAILING SHIELDS

BACKGROUND OF THE INVENTION

1. Field of the Invention

This invention relates to structures and methods for fabricating perpendicular write heads. More specifically, the invention relates to improved methods for fabricating notched trailing shields using metallic CMP stop layers to improve yields within wafer and wafer to wafer.

2. Description of the Related Art

Perpendicular write heads are currently well known in the art. A particular variant of such heads, known as the perpendicular write head with a notched trailing shield, has also been recently disclosed. See, for example US Patent Application Publications 2005/0264931, 2006/0023352, 2005/0190491, and 2005/0068671, all assigned to Hitachi Global Storage Technologies, Netherlands B.V. During the fabrication of the notched trailing shield, the tapered write pole is produced by ion milling, and the area around and above the tapered pole is filled with alumina. The alumina deposition leaves a "bump" or high spot directly above the tapered pole which must be removed to create a notch directly above the pole. The trailing shield layer is then deposited above the pole and within the notch. Removal of the "bump" is typically done with a CMP process. However, the CMP process may produce rounding and damage to the region proximate to where the notch is formed, altering the critical gap thickness and producing non-planar trailing shields. What is needed is a better process for producing the notched trailing shield for the perpendicular write head.

United States Patent Application Publication 2005/0264931 discloses fabrication of a perpendicular write head in a wafer, wherein at least two sides of a write pole are defined (e.g. by ion milling) while a third side of the write pole is protected by a masking material. At this stage, a material that is to be located in the write gap is already present between the write pole and the masking material. After definition of the write pole surfaces, a layer of dielectric material is deposited. During this deposition, the masking material is still present. Thereafter, the masking material (and any dielectric material thereon) is removed, to form a hole in the dielectric material. Next, a trailing shield is formed in the structure, so that at least one portion of the trailing shield is located in the hole, and another portion of the trailing shield is located over the dielectric material, in an area adjacent to the hole. Note that the gap material is now sandwiched between the portion of the trailing shield in the hole, and the write pole.

United States Patent Application Publication 2005/0259355 discloses a perpendicular write head including a main pole and a trailing shield, the main pole being made of a diamond-like carbon (DLC) layer as hard mask and a rhodium (Rh) layer as shield gap, both DLC and Rh layers being CMP stop layers so as to avoid corner rounding and damage from chemical mechanical planarization (CMP) process, the DLC layer being removed by reactive ion etching (RIE) to create a trench, the trailing shield being deposited into the trench for self alignment.

United States Patent Application Publication 2006/0023352 discloses a method and apparatus for providing a reverse air bearing surface head with trailing shield design for perpendicular recording. A reverse air bearing surface head for perpendicular recording is provided with an inversed bevel shape to handle skew when recording data on a magnetic recording medium.

United States Patent Application Publication 2005/0190491 discloses a perpendicular magnetic write head having a notched, self aligned trailing shield for canting a magnetic field emitted there from.

United States Patent Application Publication 2005/0068671 discloses a magnetic transducer with separated read and write heads for perpendicular recording. The write head has a trailing shield that extends from the return pole piece toward the main pole piece to form the write gap at the air-bearing surface. One embodiment of the trailing shield is a two part structure with a pedestal and a much smaller tip that confronts the main pole piece at the gap. In one embodiment a sink of non-magnetic, electrically conductive material is disposed in the separation gap between the read head and the flux bearing pole piece. The sink is preferably made of copper and does not extend to the ABS.

United States Patent Application Publication 2005/0102820 discloses that conventional liftoff processes used to define track width in magnetic read heads can produce an uneven etch-depth of dielectric materials around the sensor and cause shorting to the overlay top lead layer. This problem has been overcome by printing the images of track width and stripe height onto an intermediate layer to form a hard mask. Through this hard mask, the GMR stack can be selectively etched and then back-filled with a high-resistivity material by using newly developed electroless plating processes.

United States Patent Application Publication 2005/0068665 discloses a method and materials to fabricate a trailing shield write pole that resolve the problems of controlling the write gap and preventing damages to the write gap or pole during fabrication of the subsequent structure: This process also introduces a CMP assisted lift-off process to remove re-deposition and fencing (increase yields) and a method to create dishing in the top of the write pole. Moreover, also included in this disclosure are suitable materials that can function as an ion mill transfer layer, CMP layer, and RIEable layer.

United States Patent Application Publication 2004/0012894 discloses a magnetic head including a substrate and a data transducer positioned upon the substrate. The data transducer includes a reader comprised of a top shield and a bottom shield characterized by at least one of the shields including a layer for compensating a thermally-caused expansion of the reader.

U.S. Pat. No. 6,757,141 discloses a perpendicular recording head having a second pole piece which includes a bottom ferromagnetic shaping layer and a top ferromagnetic probe layer. Each of these layers has a flare point where the layers first commence to widen after the ABS with the flare point of the shaping layer being located between an air bearing surface (ABS) of the head and the flare point of the probe layer. Further, the probe layer has a probe at the ABS which has a decreasing width from its top to its bottom to provide a trapezoidal shape which minimizes side writing due to skew of the probe at outermost and innermost circular tracks of a rotating magnetic disk.

SUMMARY OF THE INVENTION

It is an object of the present invention to provide a method for making a perpendicular head comprising fashioning a pole structure on a surface of a substrate, the pole structure having a tapered pole section in contact with the substrate, a gap layer deposited on the tapered pole section, and a spacer layer deposited on the gap layer. The method further includes depositing a dielectric layer on the surface of the substrate, enclosing the pole structure, the dielectric layer having a first portion of thickness T1 and a second raised portion of thickness T2, the first portion of the dielectric layer having a surface approximately parallel to the surface of the substrate, the second raised portion of the dielectric layer being approximately centered over the pole structure, thickness T2 being greater than thickness T1; and depositing a stop layer on the dielectric layer. The dielectric layer is then planarized by a CMP process, a portion of the stop layer deposited on the first portion of the dielectric layer serving to terminate the CMP process.

It is another object of the present invention to provide a method for making a perpendicular head comprising fashioning a pole structure on a surface of a substrate, the pole structure having a tapered pole section in contact with the substrate, a gap layer deposited on the tapered pole section, and a spacer layer deposited on the gap layer; and depositing a dielectric layer on the surface of the substrate, enclosing the pole structure, the dielectric layer having a first portion of thickness T1 and a second raised portion of thickness T2, the first portion of said dielectric layer having a surface approximately parallel to the surface of the substrate, the second raised portion of the dielectric layer being approximately centered over the pole structure, thickness T2 being greater than thickness T1. The method further includes depositing a stop layer on the first portion and the second raised portion of the dielectric layer; depositing a photo resist layer on the stop layer; removing a portion of the photo resist layer over the second raised portion of the dielectric layer; and removing a portion of the stop layer deposited over the second raised portion of the dielectric layer. The dielectric layer is then planarized by a CMP process, a portion of the stop layer deposited on the first portion of the dielectric layer serving to terminate the CMP process.

It is yet another object of the present invention to provide a method for making a perpendicular head comprising fashioning a pole structure on a surface of a substrate, the pole structure having a tapered pole section in contact with the substrate, a gap layer deposited on the tapered pole section, and a spacer layer deposited on the gap layer; and depositing a dielectric layer on the surface of the substrate, enclosing the pole structure, the dielectric layer having a first portion of thickness T1 and a second raised portion of thickness T2, the first portion of said dielectric layer having a surface approximately parallel to the surface of the substrate, the second raised portion of the dielectric layer being approximately centered over the pole structure, thickness T2 being greater than thickness T1. The method further includes depositing a photo resist layer on the dielectric layer; removing a first portion of the photo resist layer over the first portion of the dielectric layer; depositing a stop layer subsequent to removing the photo resist; and, removing a second portion of the photo resist deposited on the second raised portion of the dielectric layer, wherein a portion of the stop layer deposited on the second portion of the photo resist is removed. The dielectric layer is then planarized by a CMP process, a portion of the stop layer deposited on the first portion of said dielectric layer serving to terminate the CMP process.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 21:
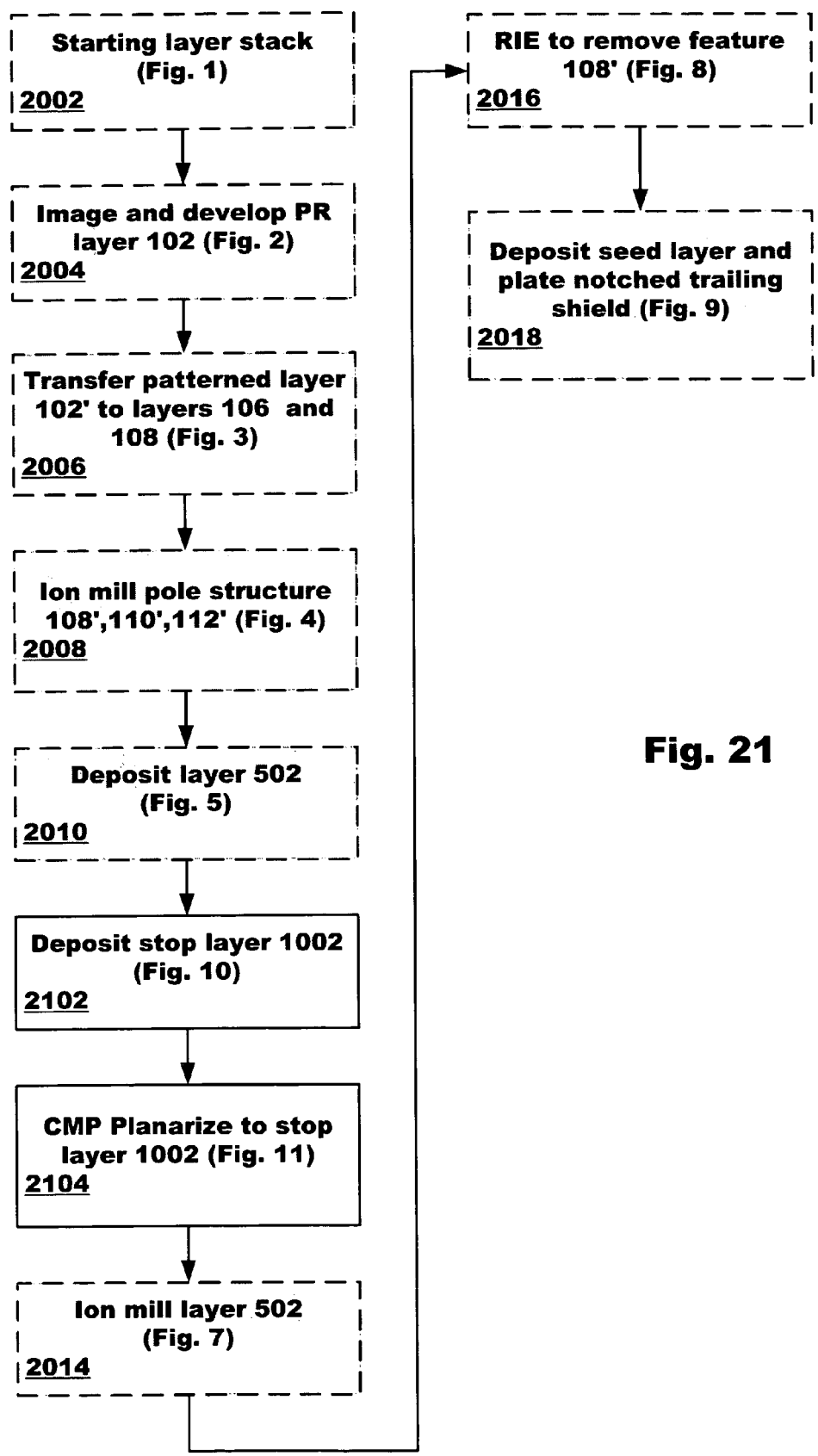
FIG. 21 is a schematic block diagram of Process A for fabricating a notched trailing shield, in accordance with an embodiment of the present invention.
Figure 22:
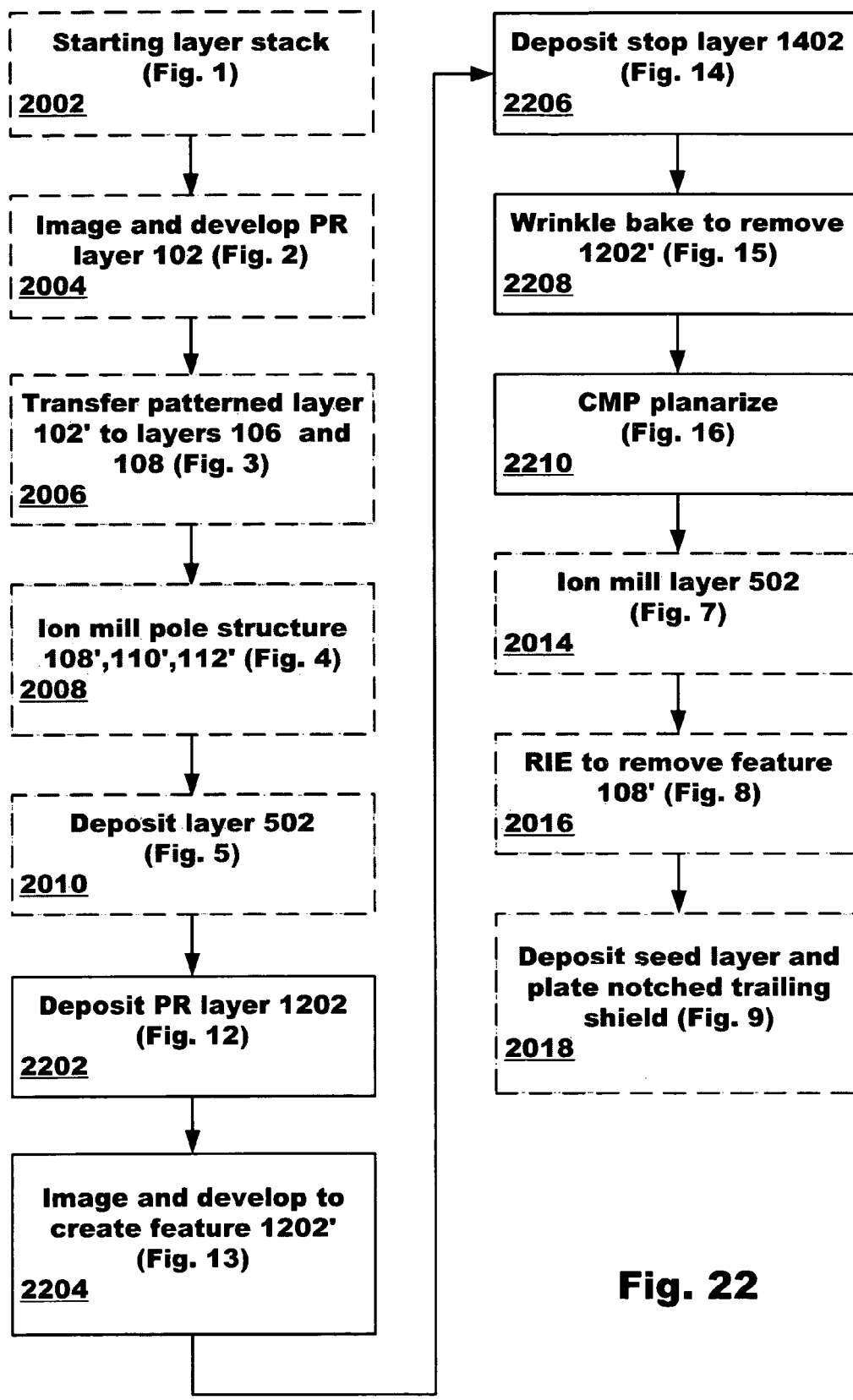
FIG. 22 is a schematic block diagram of Process B for fabricating a notched trailing shield, in accordance with an embodiment of the present invention; and, FIG. 23 is a schematic block diagram of Process C for fabricating a notched trailing shield, in accordance with an embodiment of the present invention.
Figure 23:
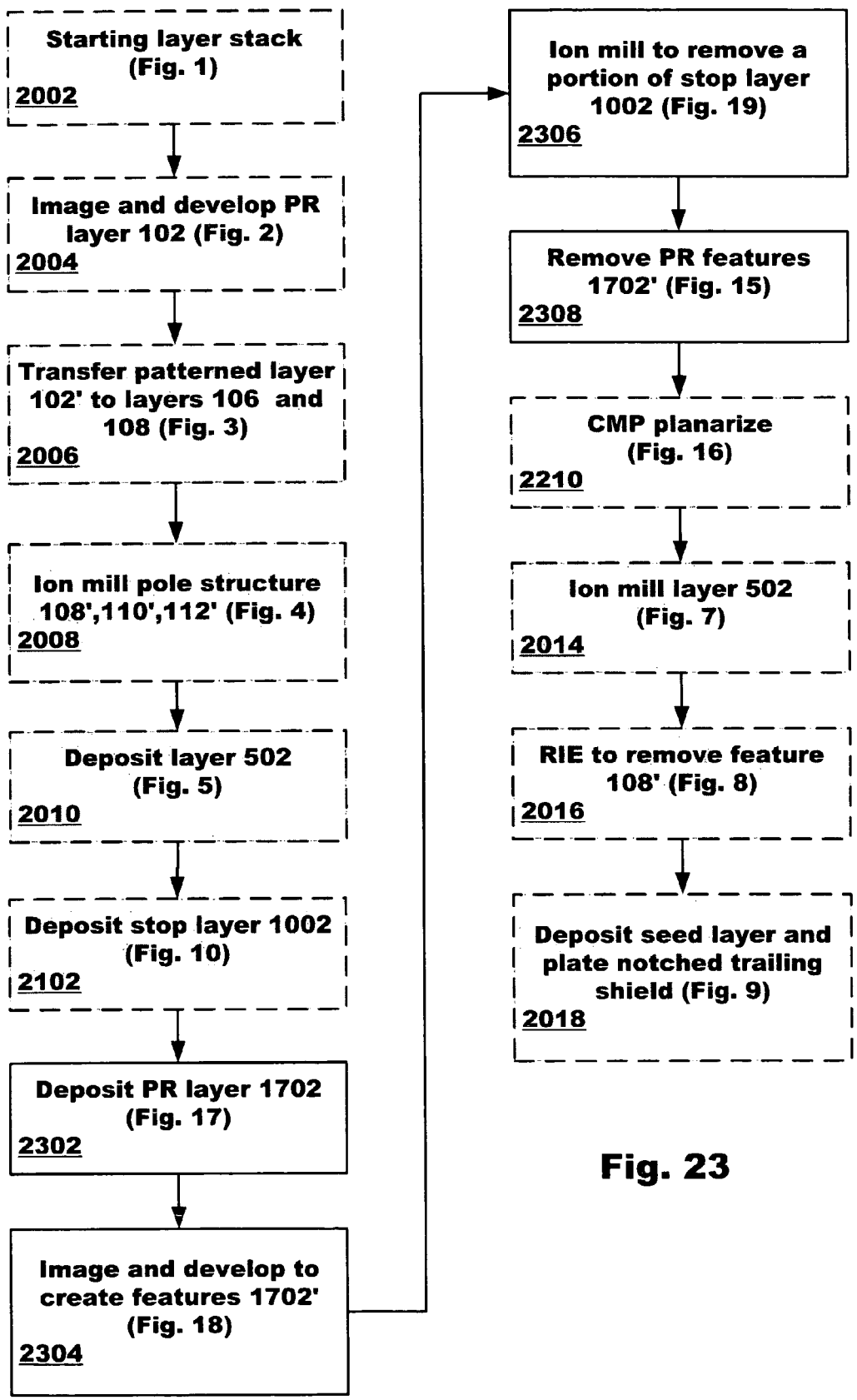

The features and description of the present invention are best understood while viewing the cross sectional structure views (FIGS. 1-19) in light of the process block diagrams (FIGS. 20-23). A basic process for fabricating a notched trailing shield is disclosed in FIG. 20, and FIGS. 1-9. Improved variants of the basic process are disclosed in Process A (FIG. 21), Process B (FIG. 22), and Process C (FIG. 23).

Figure 1:
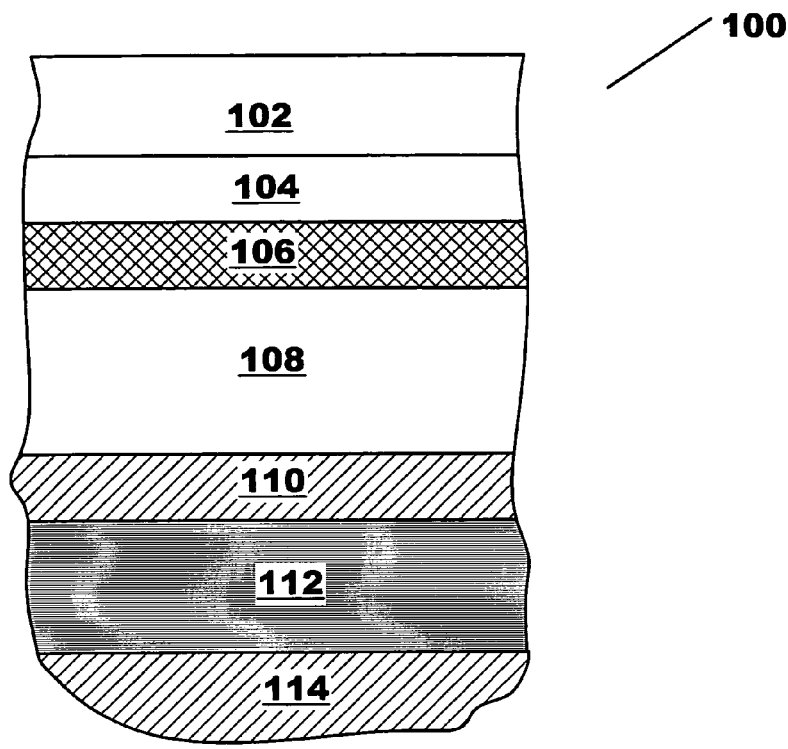
FIG. 1 is a partial cross sectional view looking into the air bearing surface (ABS) of a blanket deposited film stack prior to fabrication of a perpendicular write head with a notched trailing shield, in accordance with an embodiment of the present invention.
Figure 20:
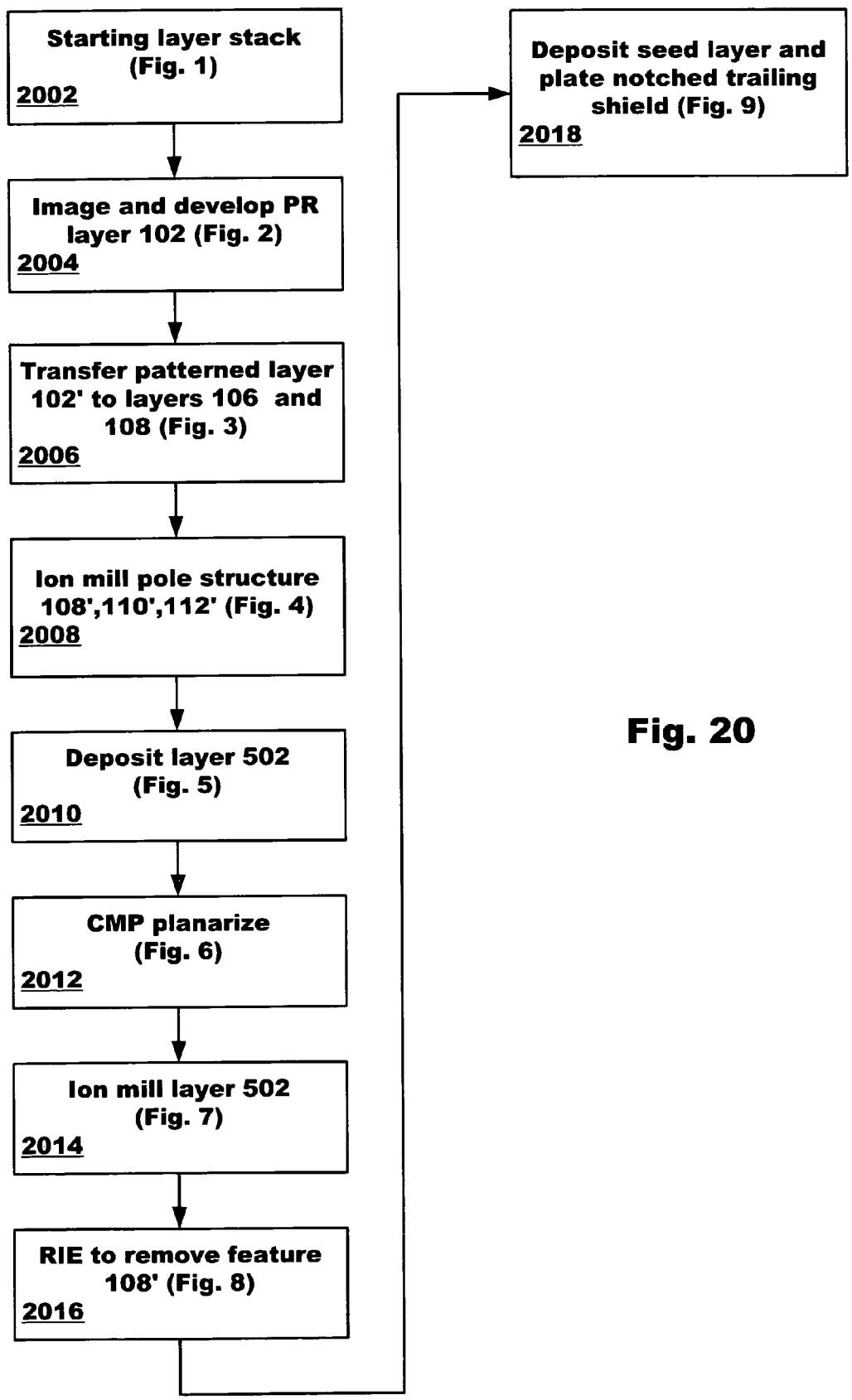
FIG. 20 is a schematic block diagram of the basic process for fabricating a notched trailing shield, in accordance with an embodiment of the present invention.

FIG. 20 is a schematic block diagram of the basic process for fabricating a notched trailing shield, in accordance with an embodiment of the present invention. The process begins at step 2002, wherein the layer stack 100 of FIG. 1 is deposited. FIG. 1 is a partial cross sectional view looking into the air bearing surface (ABS) of a blanket deposited film stack 100 prior to fabrication of a perpendicular write head with a notched trailing shield. The film stack comprises blanket layers 102-112 deposited on substrate 114, which is typically alumina (at the air bearing surface), but may be other materials such as magnetic pole shaping layers deeper (further from the ABS) into the structure. For the purposes of this disclosure, substrate 114 can be a bulk material on which all subsequent layers are deposited, or it can be a layer deposited over previously deposited under-layers. For example, when fabricating a combined read and write head structure, the latter is usually the case, as the read head structure is generally deposited first (not shown). Layer 112 makes up the magnetic pole material, and is typically a laminated, multilayer structure comprising layers of magnetic and non-magnetic materials. Layer 112 is nominally 240 nm thick. Above pole layer 112 is gap layer 110, typically 50 nm thick, comprised of alumina or other non-magnetic materials. A spacer layer 108 is deposited above gap layer 110, and is comprised of Durimide, approximately 1000 nm thick. Above spacer layer 108, layers 102, 104, and 106 are deposited. Layer 102 comprises the imaging photo resist layer that defines the width and location of the write pole. Layers 104 and 106 aid in transferring the developed features of photo resist layer 102 to the spacer layer 108. Layer 106 is typically comprised of silica nominally 100 nm thick, and layer 104 is typically comprised of Durimide nominally 60 nm thick.

Figure 2:
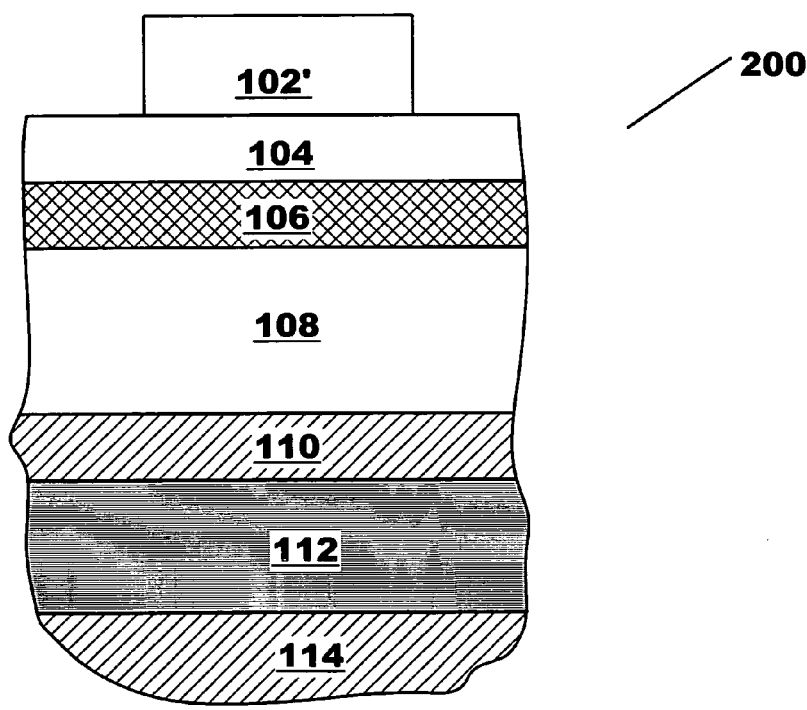
FIG. 2 is a partial cross sectional view looking into the air bearing surface (ABS) of the film structure following the imaging and development of photo-resist layer 102 in accordance with an embodiment of the present invention.

In step 2004 of FIG. 20, photo resist layer 102 is imaged and developed, creating feature 102' in FIG. 2. FIG. 2 is a partial cross sectional view looking into the air bearing surface (ABS) of the film structure 200 following the imaging and development of photo-resist layer 102.

Figure 3:
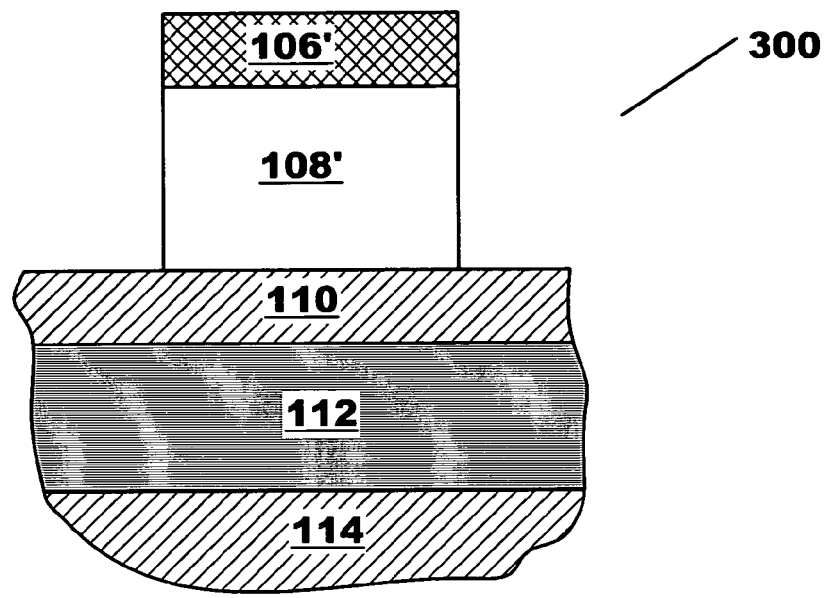
FIG. 3 is a partial cross sectional view looking into the air bearing surface (ABS) of the film structure subsequent to the transfer of patterned feature 102' into layers 106 and 108, in accordance with an embodiment of the present invention.

In step 2006 of FIG. 20, photo resist feature 102' is transferred to layers 106 and 108, creating features 106' and 108'. FIG. 3 is a partial cross sectional view looking into the air bearing surface (ABS) of the film structure 300 subsequent to the transfer of patterned feature 102' into layers 106 and 108. The transfer is carried out with three consecutive RIE process steps comprising a first oxidation step to etch layer 104, a second fluorine etch step to etch silica layer 106, followed by a third oxidation step to etch spacer layer 108. Details of the RIE processes are well known to those skilled in the art. During the oxidation steps, photo resist layer 102 is removed, resulting in structure 300.

Figure 4:
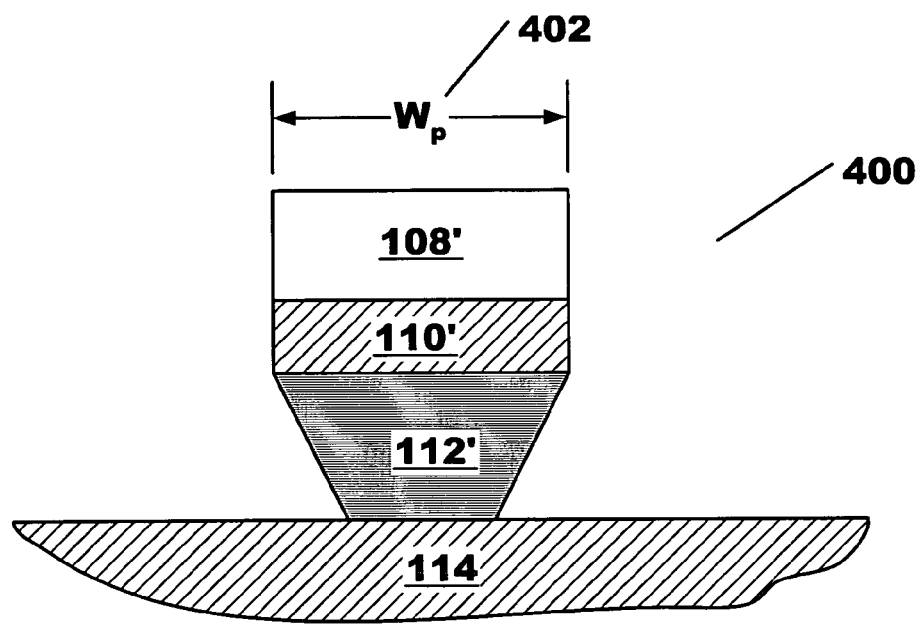
FIG. 4 is a partial cross sectional view looking into the air bearing surface (ABS) of the film structure subsequent to ion milling and formation of the pole structure, in accordance with an embodiment of the present invention.

In step 2008 of FIG. 20, the structure of FIG. 3 is ion milled to form the pole structure comprising features 108', 110' and 112'. FIG. 4 is a partial cross sectional view looking into the air bearing surface (ABS) of the film structure 400 subsequent to ion milling and formation of the pole structure. The width of the pole structure (108', 110', 112') is $W_p$ 402. Details of the formation of the tapered pole section 112' have been previously disclosed in the prior art and are well known.

Figure 5:
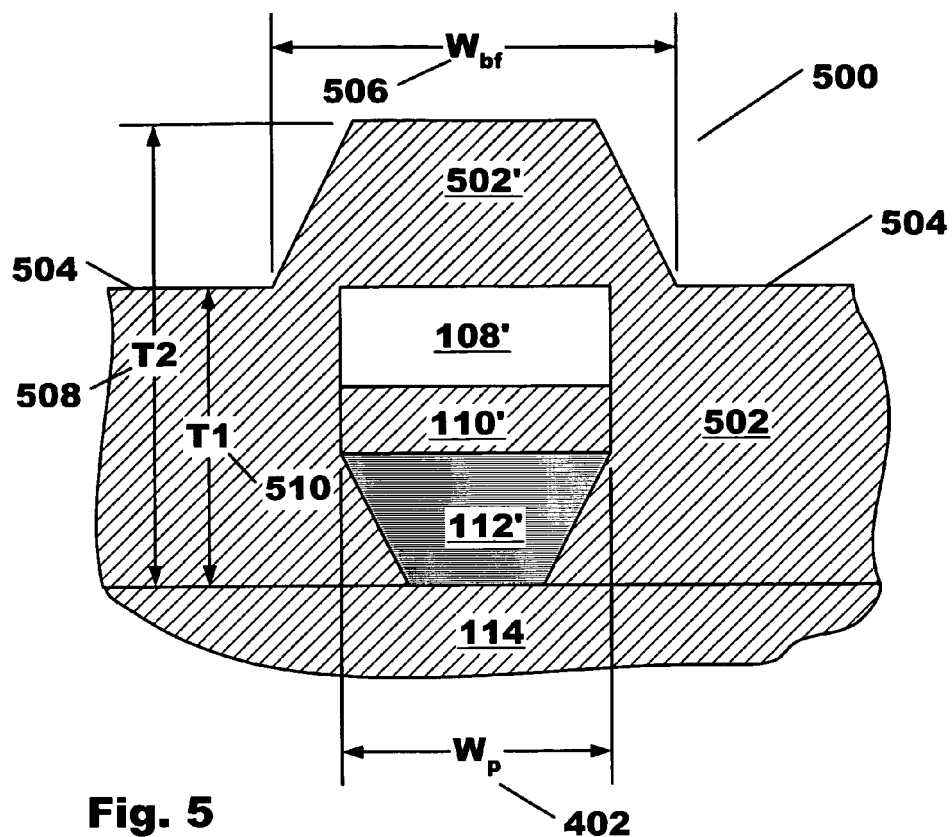
FIG. 5 is a partial cross sectional view looking into the air bearing surface (ABS) of the film structure subsequent to deposition of dielectric layer 502 in accordance with an embodiment of the present invention.

In step 2010 of FIG. 20, dielectric layer 502 is deposited around pole structure 108', 110', 112'. FIG. 5 is a partial cross sectional view looking into the air bearing surface (ABS) of the film structure 500 subsequent to deposition of dielectric layer 502. Layer 502 typically comprises alumina. Due to the conformal nature of the deposition, a raised portion of layer 502 (or "bump feature" 502') is created directly above the buried pole structure 108', 110', 112'. The thickness T2 (ref 508) of this raised portion 502', as measured from the substrate 114 surface, is greater than thickness T1 (ref 510). T1 is the thickness of the generally flat portion of layer 502, having a surface 504 that is approximately parallel to the surface of substrate 114. Typically, the width 506 of the "bump feature" ($W_{bf}$) is many times that of the pole width 402. To proceed further with the device fabrication, this "bump feature" 502' must be removed and a surface co-planar with the surface 504 of layer 502 created. This is typically done by planarization via CMP.

Figure 6:
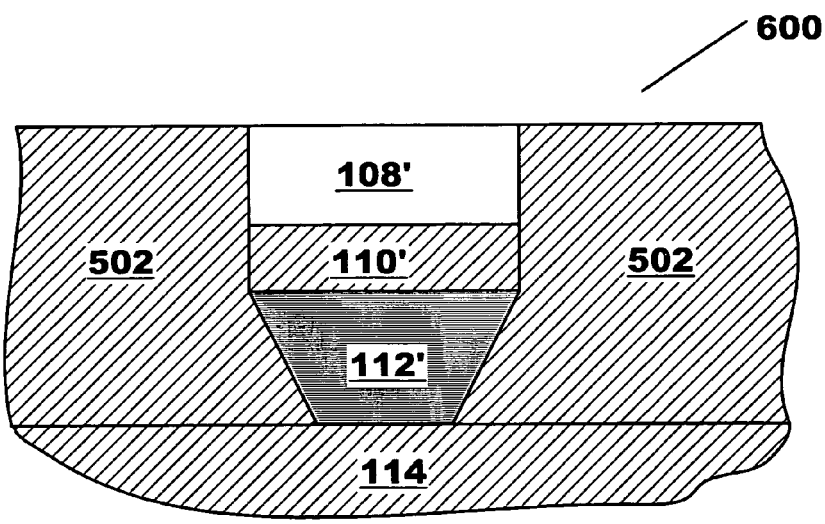
FIG. 6 is a partial cross sectional view looking into the air bearing surface (ABS) of the film structure subsequent to planarization by CMP in accordance with an embodiment of the present invention.

In step 2012 of FIG. 20, structure 500 is planarized by CMP. FIG. 6 is a partial cross sectional view looking into the air bearing surface (ABS) of the film structure 600 subsequent to planarization by CMP. No stop layer is employed in this process, also known as a "touch down" process because the planarization is carried out in such manner as to only remove the bump feature. However, termination of the process is tricky, and if carried out too far, will result in removal of spacer layer 108' and potential damage to or thinning of the gap layer 110'. If the thickness of spacer layer 108' is reduced significantly or eliminated, no notch will be created for the trailing shield, which is undesirable.

Figure 7:
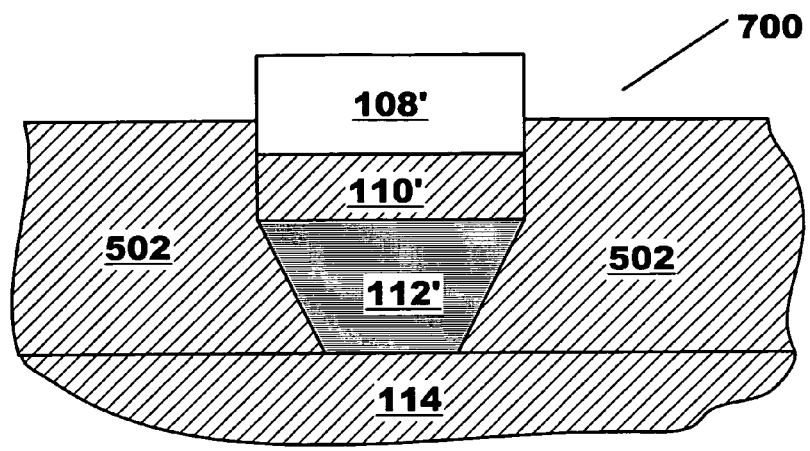
FIG. 7 is a partial cross sectional view looking into the air bearing surface (ABS) of the film structure subsequent to ion milling of layer 502 in accordance with an embodiment of the present invention.
Figure 8:
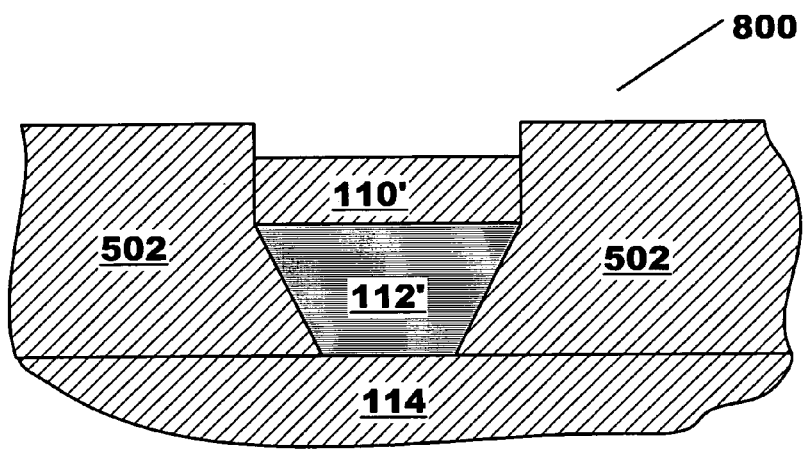
FIG. 8 is a partial cross sectional view looking into the air bearing surface (ABS) of the film structure subsequent to reactive ion etching of feature 108' in accordance with an embodiment of the present invention.
Figure 9:
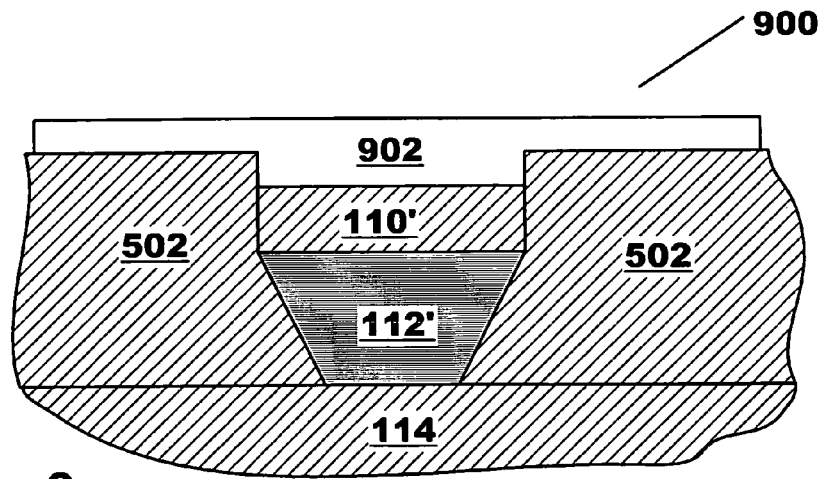
FIG. 9 is a partial cross sectional view looking into the air bearing surface (ABS) of the film structure subsequent to deposition of notched trailing shield 902 in accordance with an embodiment of the present invention.

In step 2014 of FIG. 20, layer 502 in structure 600 is ion milled to set the notch depth above the gap layer. FIG. 7 is a partial cross sectional view looking into the air bearing surface (ABS) of the film structure 700 subsequent to ion milling of layer 502. In step 2016 of FIG. 20, spacer layer 108' is removed by RIE to create the notch for the trailing shield. FIG. 8 is a partial cross sectional view looking into the air bearing surface (ABS) of the film structure 800 subsequent to reactive ion etching of layer 108'. In step 2018 of FIG. 20, a seed layer (not shown) is deposited, followed by electroplating of trailing shield 902. FIG. 9 is a partial cross sectional view looking into the air bearing surface (ABS) of the film structure 900 subsequent to deposition of notched trailing shield 902.

The foregoing basic process of FIG. 20 is suitable for producing write heads with notched trailing shields, but there are a number of aspects which can be improved upon. In particular, the CMP process in step 2012 may result in some undesirable results. It is difficult to control the termination of the process, making precise control of the notch depth difficult. In extreme cases, the gap depth may also be reduced or damaged, making the heads unusable. The basic process of FIG. 20 also produces larger than acceptable within wafer and wafer to wafer variations, affecting yields of die produced within the wafer. The preferred embodiments disclosed below in Processes A, B, and C address many of these shortcomings, providing a more reliable method for fabricating notched trailing shields, having better within wafer and wafer to wafer uniformities, and higher yields.

Figure 10:
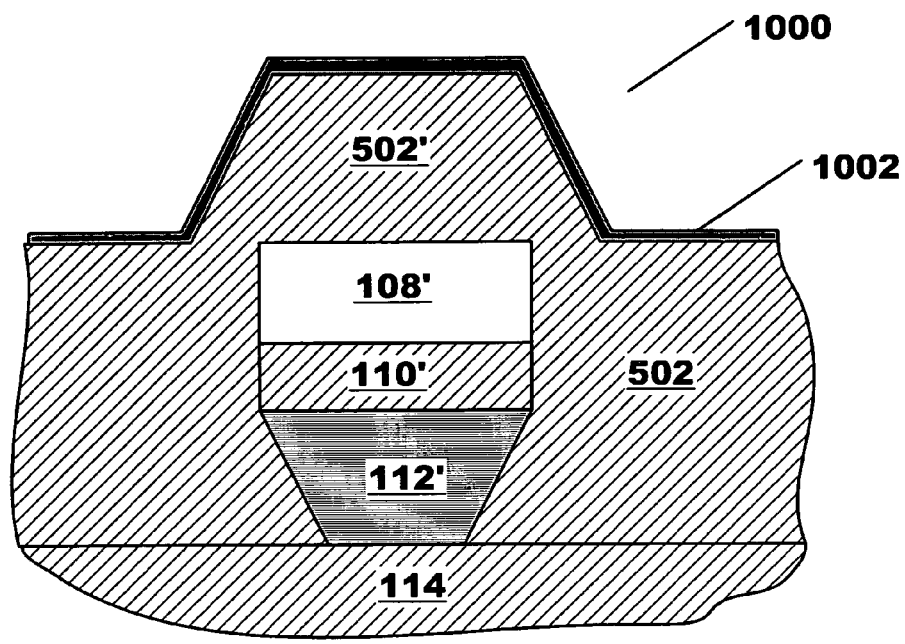
FIG. 10 is a partial cross sectional view looking into the air bearing surface (ABS) of the film structure subsequent to deposition of CMP stop layer 1002 in accordance with an embodiment of the present invention.

FIG. 21 is a schematic block diagram of Process A for fabricating a notched trailing shield, in accordance with a preferred embodiment of the present invention. Process steps 2002-2010 and 2014-2018 are the same as previously described in the basic process of FIG. 20. The previously disclosed steps are placed in shaded, dotted outline boxes to clearly distinguish them from the new steps. Following the deposition of layer 502 in step 2010, a CMP stop layer 1002 is deposited in a blanket layer over all features, including the "bump feature" 502', located above the pole structure. FIG. 10 is a partial cross sectional view looking into the air bearing surface (ABS) of the film structure 1000 subsequent to deposition of CMP stop layer 1002 in accordance with an embodiment of the present invention. The purpose of stop layer 1002 is to terminate the planarization process more precisely, and is the result of the hardness of the stop layer in comparison to alumina layer 502. Typically, DLC (diamond like carbon) is commonly used as a stop layer due to it's extreme hardness and low planarization rate of about 2 angstroms/minute. Although DLC can be used as the stop layer in this process, it is not preferred due it's brittle nature, which may chip or crack in the vicinity of "bump feature" 502'. Other materials suitable for the stop layer include Rh, Ru, Cr, and Ta. Out of these choices, Ta is the least desirable, due to a planarization rate of about 200 angstroms/minute. It may still be usable, however, since it's planarization rate is less than one tenth that of alumina (3000 angstroms/minute). Rh is the most desirable, having a planarization rate of about 2 angstroms/minute, which is as good as DLC, without the brittleness of DLC. Ru and Cr are usable, better than Ta but not as good as Rh, with planarization rates of about 60 and 70 angstroms/minute, respectively. When Rh is used as stop layer 1002, a Ta layer may be used underneath the Rh layer to improve adhesion to layer 502. Deposition thickness for a Rh stop layer can range from 15 to 35 nm, preferably about 25 nm. If a Ta layer is used, it can range from 3-7 nm in thickness, preferably about 5 nm.

Figure 11:
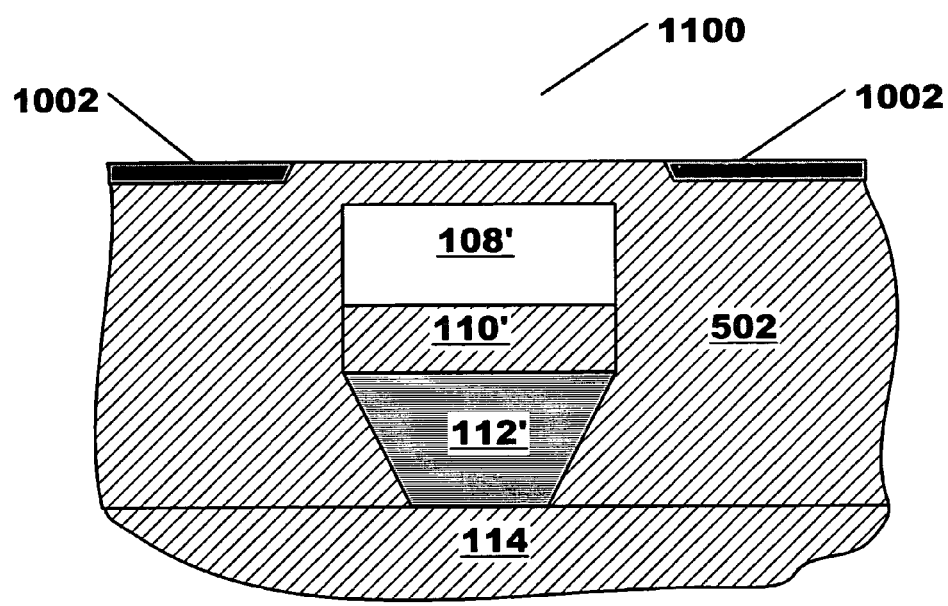
FIG. 11 is a partial cross sectional view looking into the air bearing surface (ABS) of the film structure subsequent to planarization of the structure of FIG. 10 in accordance with an embodiment of the present invention.

In step 2104 of FIG. 21, structure 1000 is planarized by CMP to the stop layer. FIG. 11 is a partial cross sectional view looking into the air bearing surface (ABS) of the film structure 1100 subsequent to planarization of the structure 1000 of FIG. 10 in accordance with an embodiment of the present invention. Although the "bump feature" 502' is coated with the stop layer, planarization is still possible due to the reduced surface area of the "bump feature" in comparison to the surface area of surface 504. Once the planarization process has cut though the stop layer covering the top surface of the "bump feature", the process will proceed rapidly until the stop layer 1002 covering surface 504 is reached. At that point, the large surface area of the remaining stop layer will effectively terminate the planarization process. With an appropriate thickness for layer 502, the process can be designed in such a manner as to have little or no impact on spacer layer 108' or gap layer 110'.

In step 2014 of FIG. 21, structure 1100 is ion milled to remove the remaining stop layer 1002 and a portion of layer 502. The resulting structure 700 is shown in FIG. 7. The degree of ion milling determines the gap depth, which is not affected by the planarization process of step 2104. Process steps 2016 and 2018 complete the process as previously described above.

One disadvantage of Process A is the requirement to planarize through the stop layer deposited on the "bump feature" 502'. The hardness of the stop layer slows planarization of the "bump features" when compared to the basic process of FIG. 20, for example. An improvement on this process would be realized if the stop layer could be selectively deposited only where needed, on the planar surfaces of layer 502 parallel to the substrate 114, exclusive of the "bump features". This is the object of Process B and Process C of the present invention.

Figure 12:
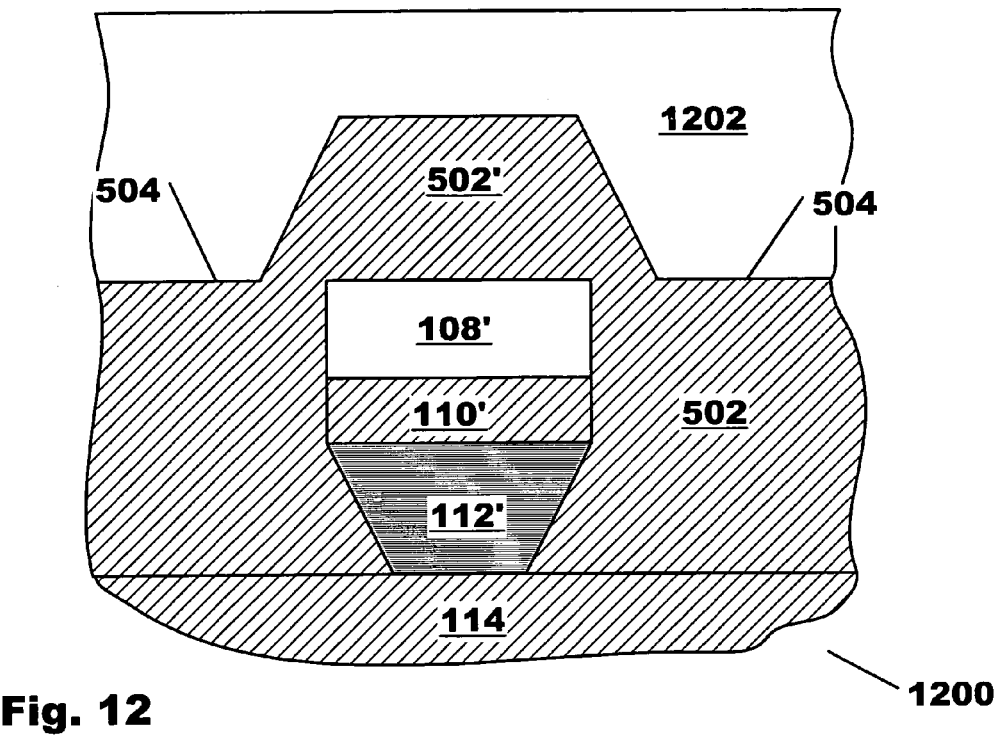
FIG. 12 is a partial cross sectional view looking into the air bearing surface (ABS) of the film structure subsequent to deposition of photo resist layer 1202 in accordance with an embodiment of the present invention.

FIG. 22 is a schematic block diagram of Process B for fabricating a notched trailing shield, in accordance with a preferred embodiment of the present invention. Process steps 2002-2010 and 2014-2018 are the same as previously described in the basic process of FIG. 20. The previously disclosed steps are placed in shaded, dotted outline boxes to clearly distinguish them from new steps 2202-2210. Following the deposition of layer 502 in step 2010, a blanket photo resist layer 1202 is deposited in step 2202. FIG. 12 is a partial cross sectional view looking into the air bearing surface (ABS) of the film structure 1200 subsequent to deposition of photo resist layer 1202 in accordance with an embodiment of the present invention.

Figure 13:
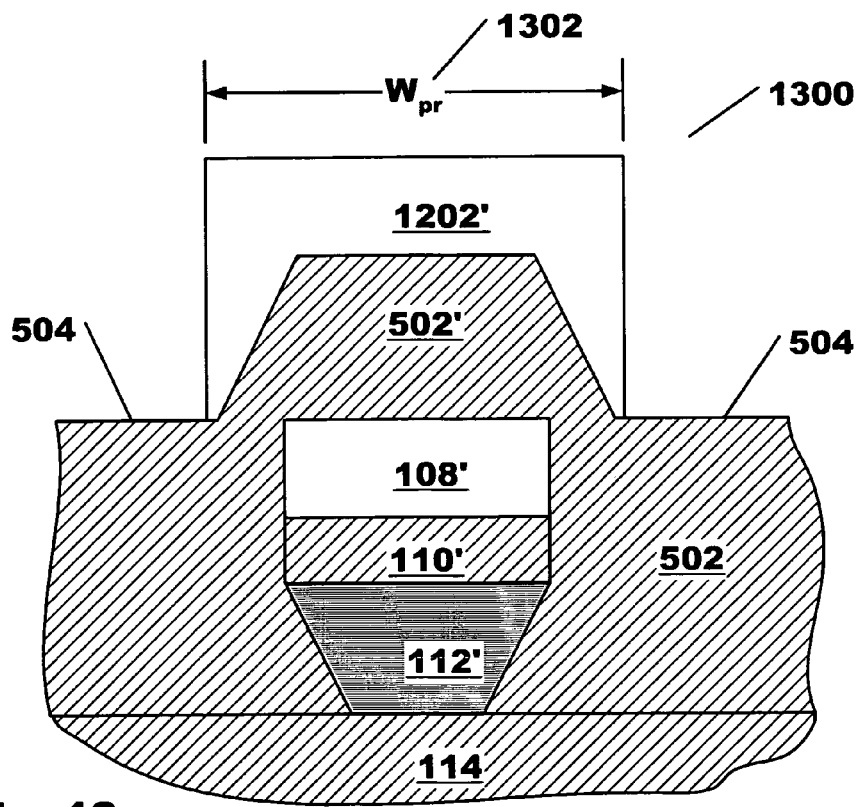
FIG. 13 is a partial cross sectional view looking into the air bearing surface (ABS) of the film structure subsequent to imaging and development of photo resist layer 1202 in accordance with an embodiment of the present invention.

In step 2204 of FIG. 22, photo resist layer 1202 is imaged and developed to create feature 1202'. FIG. 13 is a partial cross sectional view looking into the air bearing surface (ABS) of the film structure 1300 subsequent to imaging and development of photo resist layer 1202 in accordance with an embodiment of the present invention. Photo resist feature 1202', having width 1302 ($W_{pr}$) is designed to cover the entire width $W_{bf}$ of the "bump feature" 502', and terminates on the planar portion of layer 502 on either side of the "bump feature". The actual width 1302 of feature 1202' is not critical, as long as the "bump feature" 502' is completely enclosed, or $W_{pr} > W_{bf}$.

Figure 14:
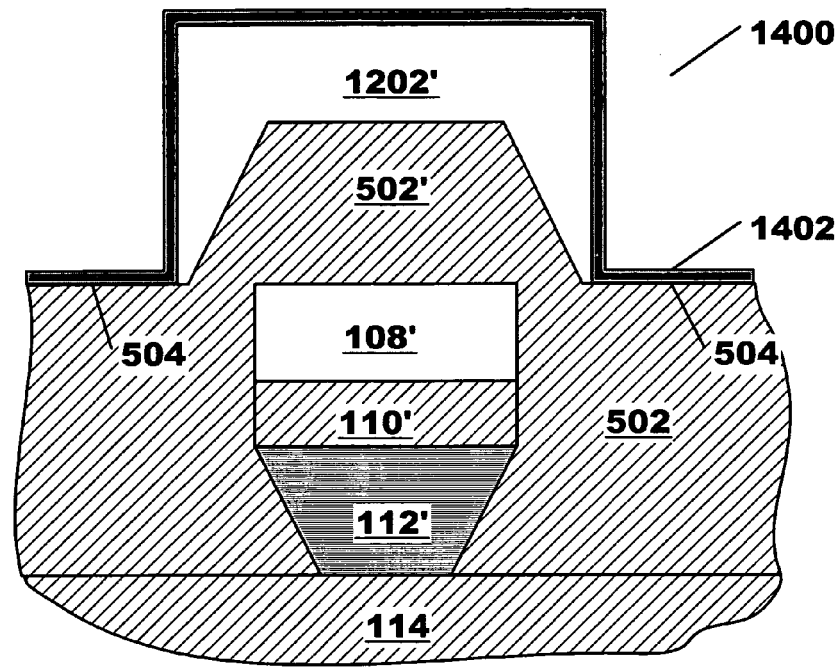
FIG. 14 is a partial cross sectional view looking into the air bearing surface (ABS) of the film structure subsequent to deposition of stop layer 1402 in accordance with an embodiment of the present invention.

In step 2206 of FIG. 22, a blanket stop layer 1402 is deposited on structure 1300. FIG. 14 is a partial cross sectional view looking into the air bearing surface (ABS) of the film structure 1400 subsequent to deposition of stop layer 1402 in accordance with an embodiment of the present invention. Materials suitable for the stop layer include Rh, Ru, Cr, and Ta. Out of these choices, Rh is preferred, due to it's low planarization rate (previously discussed above). DLC is not suitable for this process. Ru, Cr, and Ta may also be used, but are not preferred. When Rh is used as stop layer 1402, a Ta layer may be used underneath the Rh layer to improve adhesion to layer 502. Deposition thickness for a Rh stop layer can range from 15 to 35 nm, preferably about 25 nm. If a Ta layer is used, it can range from 3-7 nm in thickness, preferably about 5 nm.

Figure 15:
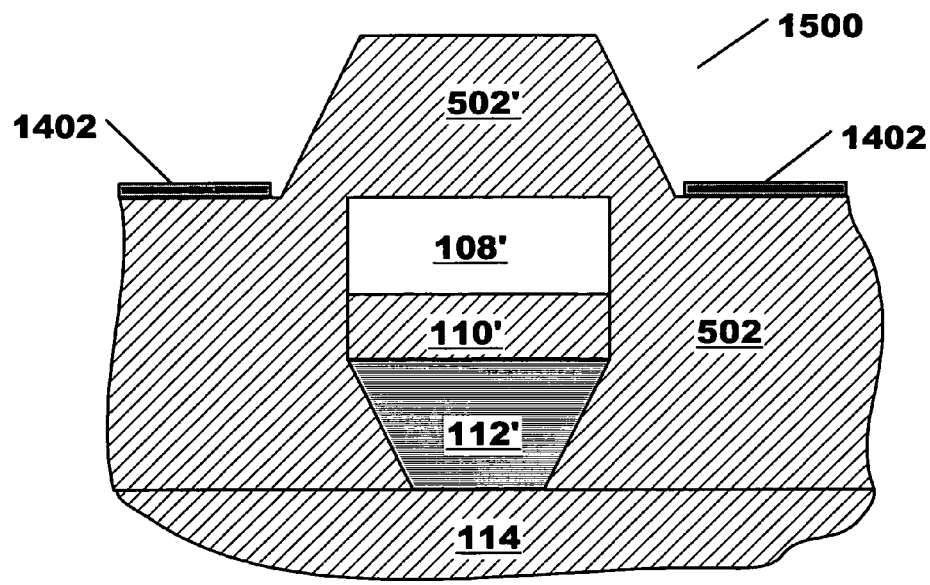
FIG. 15 is a partial cross sectional view looking into the air bearing surface (ABS) of the film structure subsequent to removal of photo resist feature 1202' in accordance with an embodiment of the present invention.

In step 2208 of FIG. 22, feature 1202' is removed. FIG. 15 is a partial cross sectional view looking into the air bearing surface (ABS) of the film structure 1500 subsequent to removal of photo resist feature 1202' in accordance with an embodiment of the present invention. Feature 1202' and the portion of stop layer 1402 covering feature 1202' are removed by a combination of baking and photo resist stripping processes. The baking step, known as "wrinkle baking" causes the photo resist feature 1202' to expand, cracking and rupturing the stop layer covering it. This allows an oxidizing strip chemistry (either wet or dry) to attack the exposed resist and remove it from the "bump feature" 502'. Portions of stop layer 1402 adherent to surface 504 of layer 502 are not affected and remain on the structure 1500.

Figure 16:
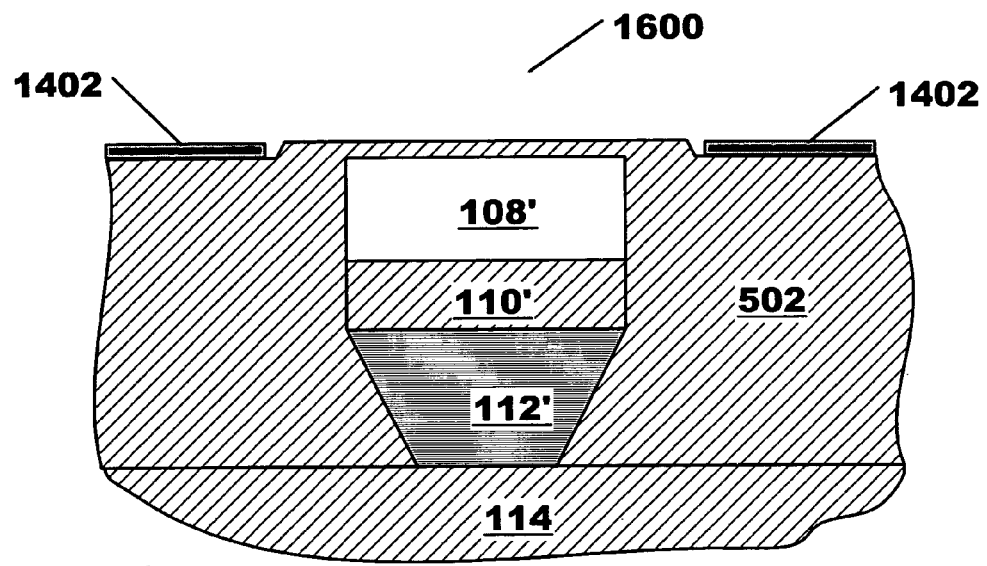
FIG. 16 is a partial cross sectional view looking into the air bearing surface (ABS) of the film structure subsequent to planarization of the structure of FIG. 15 in accordance with an embodiment of the present invention.

In step 2210 of FIG. 22, structure 1500 is planarized by CMP. FIG. 16 is a partial cross sectional view looking into the air bearing surface (ABS) of the film structure 1600 subsequent to planarization of the structure of FIG. 15, in accordance with an embodiment of the present invention. The "bump feature" 502' is effectively removed at a faster rate than in Process A, because only the alumina material of layer 502 is being planarized. Stop layer 1402 terminates the planarization process due to its very low planarization rate, before any damage to the pole structure can be realized.

In step 2104 of FIG. 22, structure 1600 is ion milled to remove the remaining stop layer 1402 and a portion of layer 502. The resulting structure 700 is shown in FIG. 7. The degree of ion milling determines the gap depth, which is not affected by the planarization process of step 2104. Process steps 2016 and 2018 complete the process as previously described above.

FIG. 23 is a schematic block diagram of Process C for fabricating a notched trailing shield, in accordance with a preferred embodiment of the present invention. Process steps 2002-2010, 2102, 2210 and 2014-2018 are the same as previously described. The previously disclosed steps are placed in shaded, dotted outline boxes to clearly distinguish them from new steps 2302-2308. In Process C, a blanket stop layer 1002 is deposited on structure 500 of FIG. 5, as was done in step 2102 of FIG. 21 (Process A). The limitations and preferences for the stop layer 1002 disclosed above under the discussion of Process A apply here as well, including the use of DLC as a stop layer material. Although not preferred, DLC layers may be used in Process C.

Figure 17:
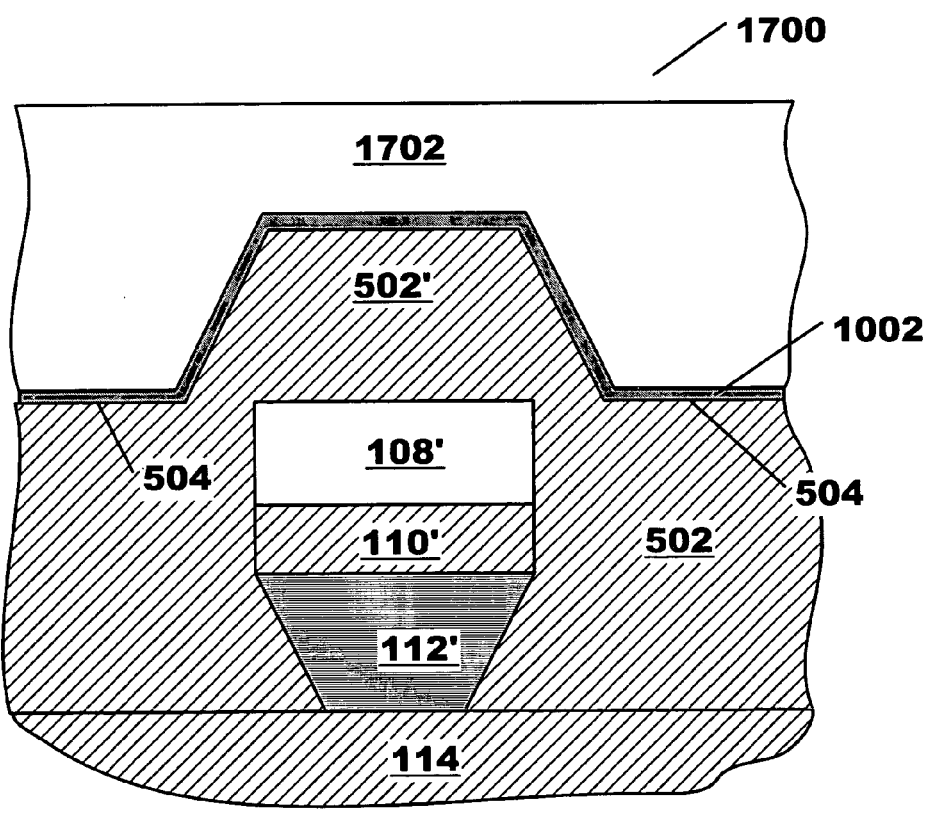
FIG. 17 is a partial cross sectional view looking into the air bearing surface (ABS) of the film structure subsequent to deposition of photo resist layer 1702 in accordance with an embodiment of the present invention.

In step 2302 of FIG. 23, a blanket photo resist layer 1702 is deposited over stop layer 1002. FIG. 17 is a partial cross sectional view looking into the air bearing surface (ABS) of the film structure 1700 subsequent to deposition of photo resist layer 1702 in accordance with an embodiment of the present invention.

Figure 18:
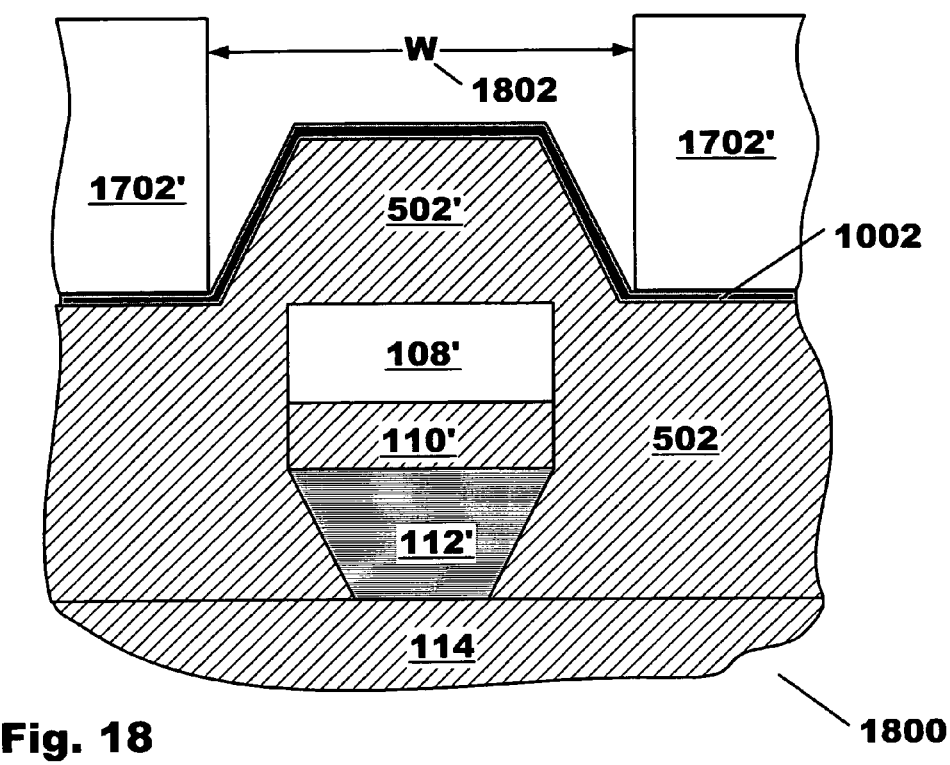
FIG. 18 is a partial cross sectional view looking into the air bearing surface (ABS) of the film structure subsequent to imaging and development of photo resist layer 1702 in accordance with an embodiment of the present invention.

In step 2304 of FIG. 23, photo resist layer 1702 is imaged and developed. FIG. 18 is a partial cross sectional view looking into the air bearing surface (ABS) of the film structure 1800 subsequent to imaging and development of photo resist layer 1702 in accordance with an embodiment of the present invention. In this step, photo resist is removed from a channel of width W (1802) surrounding "bump feature" 502', leaving photo resist features 1702' which cover the surface 504 of layer 502 on either side of the "bump feature". The amount of photo resist layer 1702 removed is not critical, as long as "bump feature" 502' is fully exposed (having no photo resist coverage). Extending the photo resist removal zone beyond the width 1802 of the "bump feature" is allowed, as long as there is sufficient coverage of stop layer on surface 504 of layer 502 to provide a planarization stop. That is, $W > W_{bf}$.

Figure 19:
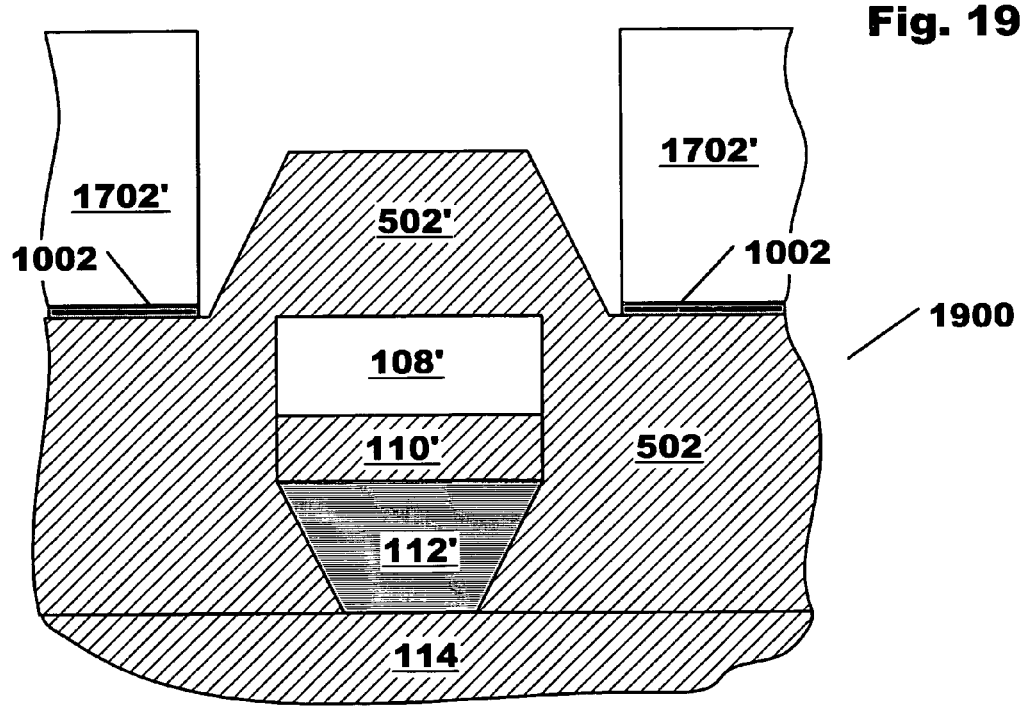
FIG. 19 is a partial cross sectional view looking into the air bearing surface (ABS) of the film structure subsequent to removal of a portion of stop layer 1002 in accordance with an embodiment of the present invention.

In step 2306 of FIG. 23, the stop layer 1002 exposed by removal of the photo resist in the previous step is removed. FIG. 19 is a partial cross sectional view looking into the air bearing surface (ABS) of the film structure 1900 subsequent to removal of a portion of stop layer 1002 in accordance with an embodiment of the present invention. Ion milling can be used to remove Rh, Ru, Cr, and Ta. For the special case of DLC, an oxidizing RIE process can be used. This process may also damage the photo resist features 1702' remaining, but this are not critical, and a small degree of undercutting of layer 1002 under the photo resist near the boundaries is not a problem.

In step 2308 of FIG. 23, the remaining photo resist is removed from the surface of the stop layer 1002. The resulting structure is depicted in FIG. 15, with the exception that the stop layer is labeled 1002, not 1402. In step 2210, the "bump feature" is planarized by CMP as in preceding processes. It is also possible to combine these two steps, and planarize structure 1900 of FIG. 19 without a separate photo resist removal step, since the CMP process could remove the photo resist layer and the "bump feature" in a single step.

Steps 2014-2018 complete the process and are described above.

The present invention is not limited by the previous embodiments heretofore described. Rather, the scope of the present invention is to be defined by these descriptions taken together with the attached claims and their equivalents.

What is claimed is:

1. A method for making a perpendicular head comprising:
  fashioning a pole structure on a surface of a substrate, said pole structure having a tapered pole section in contact with said substrate, a gap layer deposited on said tapered pole section, and a spacer layer deposited on said gap layer;
  depositing a dielectric layer on said surface of said substrate, enclosing said pole structure, said dielectric layer having a first portion of thickness T1 and a second raised portion of thickness T2, said first portion of said dielectric layer having a surface approximately parallel to said surface of said substrate, said second raised portion of said dielectric layer being approximately centered over said pole structure, said thickness T2 being greater than said thickness T1;
  depositing a photo resist layer on said dielectric layer;
  removing a first portion of said photo resist layer over said first portion of said dielectric layer;
  depositing a stop layer subsequent to removing said first portion of said photo resist;
  removing a second portion of said photo resist deposited on said second raised portion of said dielectric layer, wherein a portion of said stop layer deposited on said second portion of said photo resist is removed; and,
  planarizing said dielectric layer by a CMP process, subsequent to removing said second portion of said photo resist deposited on said second raised portion of said dielectric layer, a portion of said stop layer deposited on said first portion of said dielectric layer serving to terminate said CMP process.

2. The method as recited in claim 1, wherein said stop layer has a planarization rate less than 200 angstroms/minute.

3. The method as recited in claim 1, wherein said stop layer has a planarization rate less than 100 angstroms/minute.

4. The method as recited in claim 1, wherein said stop layer has a planarization rate less than 5 angstroms/minute.

5. The method as recited in claim 1, wherein said stop layer is selected from the group consisting of Rh, Ta, Cr, Ru, diamond-like carbon, and alloys and mixtures of the forgoing.

6. The method as recited in claim 1, wherein said stop layer consists essentially of Rh.

7. The method as recited in claim 1, wherein said stop layer comprises a first layer of Ta, and a second layer of Rh.

8. The method as recited in claim 1, wherein said stop layer is between 15 and 35 nm in thickness.

* * * * *